(12) United States Patent
Alston et al.

(10) Patent No.: US 8,139,745 B2
(45) Date of Patent: *Mar. 20, 2012

(54) CALLING PARTY RINGTONE SELECTION IN TELEPHONE SYSTEM

(75) Inventors: Douglas B. Alston, Fayetteville, GA (US); Frederick C. Iffland, Dunwoody, GA (US); Douglas R. O'Neil, Marietta, GA (US); Scott T. Stillman, Peachtree City, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 1231 days.

This patent is subject to a terminal disclaimer.

(21) Appl. No.: 11/107,128

(22) Filed: Apr. 15, 2005

(65) Prior Publication Data

US 2005/0180554 A1 Aug. 18, 2005

Related U.S. Application Data

(63) Continuation-in-part of application No. 10/281,759, filed on Oct. 28, 2002, now Pat. No. 6,901,139.

(51) Int. Cl.
H04M 3/42 (2006.01)
H04M 3/00 (2006.01)

(52) U.S. Cl. ............... 379/207.16; 379/373.01

(58) Field of Classification Search .......... 370/260; 379/93.25, 142.01–142.14, 207.04, 373.02, 379/373.01–373.03; 455/414.1, 415, 567
See application file for complete search history.

(56) References Cited

U.S. PATENT DOCUMENTS

| | | | | |
|---|---|---|---|---|
| 5,559,860 | A | * | 9/1996 | Mizikovsky .................. 455/413 |
| 6,031,899 | A | * | 2/2000 | Wu .......................... 379/142.01 |
| 6,125,127 | A | * | 9/2000 | Smith, Jr. ...................... 370/524 |
| 6,370,233 | B1 | | 4/2002 | Bennett, III et al. ............ 379/37 |
| 6,400,808 | B1 | | 6/2002 | Burg |
| 6,516,057 | B2 | | 2/2003 | Meek |
| 6,650,746 | B1 | * | 11/2003 | Groen et al. ............. 379/207.16 |
| 6,671,370 | B1 | * | 12/2003 | Heinonen et al. ........ 379/373.02 |
| 6,697,473 | B2 | | 2/2004 | Batten .......................... 379/199 |
| 6,718,021 | B2 | * | 4/2004 | Crockett et al. ........... 379/93.23 |
| 6,813,344 | B1 | * | 11/2004 | Lemke ..................... 379/142.06 |
| 6,901,139 | B2 | | 5/2005 | Gonzalez et al. |
| 7,082,190 | B2 | | 7/2006 | Simpson |
| 7,170,883 | B2 | | 1/2007 | Harris |
| 2001/0024965 | A1 | * | 9/2001 | Hayashi ....................... 455/567 |
| 2003/0123631 | A1 | | 7/2003 | Moss |
| 2004/0032946 | A1 | * | 2/2004 | Koser et al. ............. 379/373.01 |
| 2004/0109558 | A1 | | 6/2004 | Koch |
| 2004/0213401 | A1 | | 10/2004 | Aupperle |
| 2005/0207556 | A1 | | 9/2005 | Gonzalez |
| 2005/0287997 | A1 | * | 12/2005 | Fournier ....................... 455/415 |
| 2006/0258340 | A1 | * | 11/2006 | Eronen ...................... 455/414.1 |

* cited by examiner

*Primary Examiner* — Ahmad Matar
*Assistant Examiner* — Oleg Asanbayev
(74) *Attorney, Agent, or Firm* — Scott P. Zimmerman PLLC (57) ABSTRACT

A ring tone service is provided to a called party upon receiving a call from a calling party at a device of the called party, where the device annunciates the call according to a particular ring tone as determined by the called party. A network-based call control manager receives a notification that the calling party is calling the called party, and the call control manager queries a network-based ring tone manager to determine the particular ring tone. The ring tone manager notifies the call control manager of the determined ring tone, and the call control manager sets up the call to be annunciated at the device of the called party according to the determined ring tone.

19 Claims, 6 Drawing Sheets

CALLING PARTY RINGTONE SELECTION IN TELEPHONE SYSTEM

CROSS-REFERENCE TO RELATED APPLICATION

The present application is a continuation-in-part of U.S. patent application Ser. No. 10/281,759, filed Oct. 28, 2002, hereby incorporated by reference in its entirety.

FIELD OF THE INVENTION

The present invention relates to a telephone system where a ring tone is employed to annunciate a call from a calling party to a called party and is selected by a network-based manager. More particularly, the present invention relates to a telephone service where such network-based manager can deliver the ring tone based on an identification of the calling party, a type of the calling party, or the like.

BACKGROUND OF THE INVENTION

In recent years, a number of new telephone service features have been provided by an Advanced Intelligent Network (AIN). The AIN evolved out of a need to increase the capabilities of the telephone network architecture in order to meet the growing needs of telephone customers or users. Additionally, as the number of people who rely on the Internet for communication increases, so does the demand for the electronic transfer of data.

Figure 1:
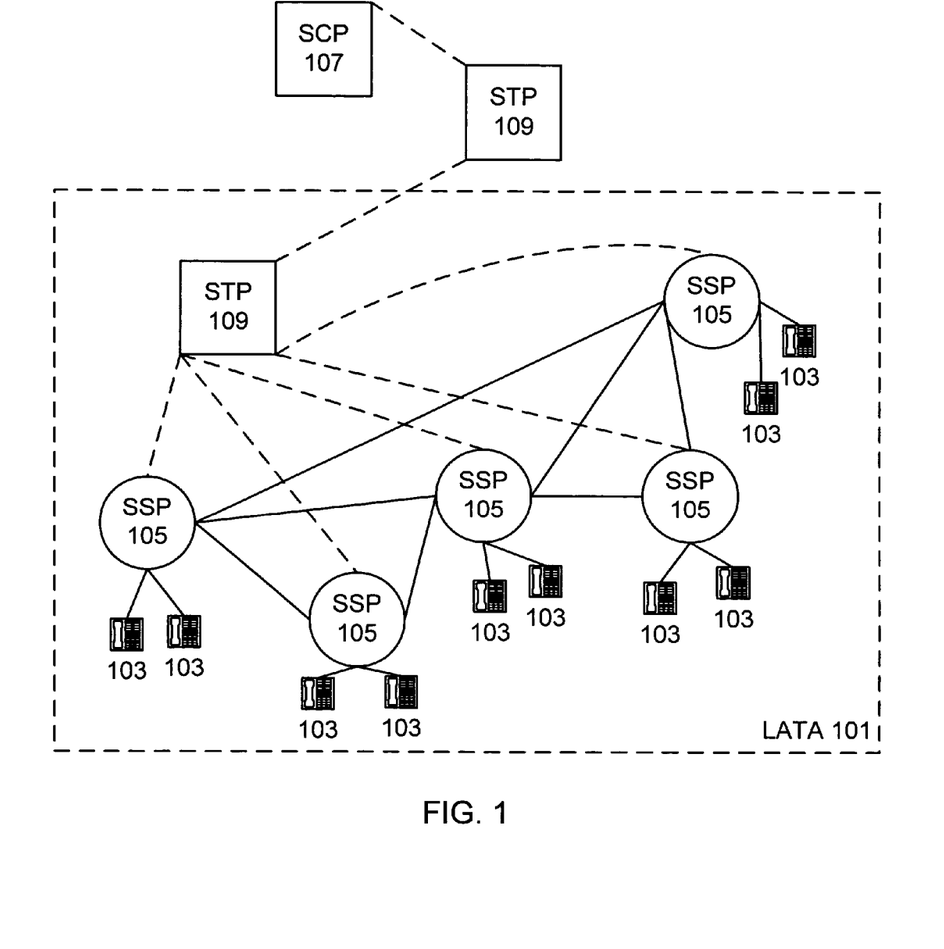
FIG. 1 is a block diagram showing a typical AIN-based telephone network such as may be employed in connection with the present invention.

Referring now to FIG. 1, it is seen that an AIN-based network arrangement is provided within and/or in conjunction with each of several wire line telephone system LATAs (Local Access and Transport Area) 101, each of which defines a calling service area. Note that a similar arrangement is also provided with and/or in conjunction with a wireless telephone system. Each LATA 101 (only one being shown in FIG. 1) includes stations (i.e. telephone lines and telephone equipment at the ends thereof) 103 and corresponding service switching points (SSPs) 105 at end offices or central offices. The SSPs 105 are each programmable switches which: recognize AIN-type calls; launch queries to service control points (SCPs) 107 (only one being shown in FIG. 1); and receive commands and data from SCPs 107 to further process and route AIN-type calls within and between the LATAs 101. A signal transfer point (STP) 109 may be employed to route signals between the SSPs 105, the SCPs 107, and other network elements. When one of the SSPs 105 is triggered by an AIN-type call, the triggered SSP 105 formulates an AIN service request for a particular AIN element such as an SCP 107, sends the request to the element, receives a response including call processing instructions from the element, and acts in accordance with the received call processing instructions.

An AIN trigger may be associated with a called party and an SSP 105 thereof or a called party and an SSP 105 thereof. One type of event that may be arranged to set off an AIN trigger in an SSP 105 or the like is a call from a calling party to a called party where the called party has arranged for a telephone service to be performed prior to having the call put through. Here, the trigger is associated with the SSP 105 of the called party, and the service may be any sort of service, such as for example a service to check first to see if the line of the called party is busy, and if so to forward the call to an alternate number or an answering service.

Typically, a call when put through to a called party causes a signal to be annunciated (a ring tone to be played, e.g.) at the telephone or the like of the called party, whereby the signal/ring tone (hereinafter, 'ring tone') alerts the called party to the call and the called party may answer same. In the case of a wire line telephone system, the ring tone is typically generated by the end office or central office associated with the called party, and in the case of a wireless telephone system or a networked telephone system, the ring tone is typically generated at the telephone or the like in response to a ring tone generation command from a switching center or the like. Typically, the ring tone played is always the same ring tone regardless of the nature of the telephone call, even when the called party can select the ring tone.

When a calling party calls a called party, then, the called party is presented with the same ring tone regardless of whether the call is routine, special, urgent, an emergency, or the like. As should be appreciated, however, the called party may instead wish to be presented with a different ring tone for each of several types of calls, so that the called party may for example have an opportunity to decide to answer each call based on the nature of the call as represented by the ring tone presented for such call.

Accordingly, a need exists for a method and mechanism by which the called party can in fact be provided with a different ring tone for each of several types of calls, and for example may indeed have an opportunity to decide to answer each call based on the nature of the call as represented by the ring tone presented for such call. More particularly, a need exists for such a method and mechanism by which the calling party is given an opportunity to specify a type for the call, and based on the type specified a particular ring tone is presented to the called party. Further, a need exists for a method and mechanism whereby the ring tone is provided to the telephone by a network-based ring tone manager while the call is being setup.

SUMMARY OF THE INVENTION

The present invention satisfies the aforementioned need by providing a system and method employed to provide a ring tone service to a called party upon receiving a call from a calling party at a device of the called party, where the device annunciates the call according to a particular ring tone as determined by the called party. In the method, a network-based call control manager receives a notification that the calling party is calling the called party, and the call control manager queries a network-based ring tone manager to determine the particular ring tone. The ring tone manager notifies the call control manager of the determined ring tone, and the call control manager sets up the call to be annunciated at the device of the called party according to the determined ring tone.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 2:
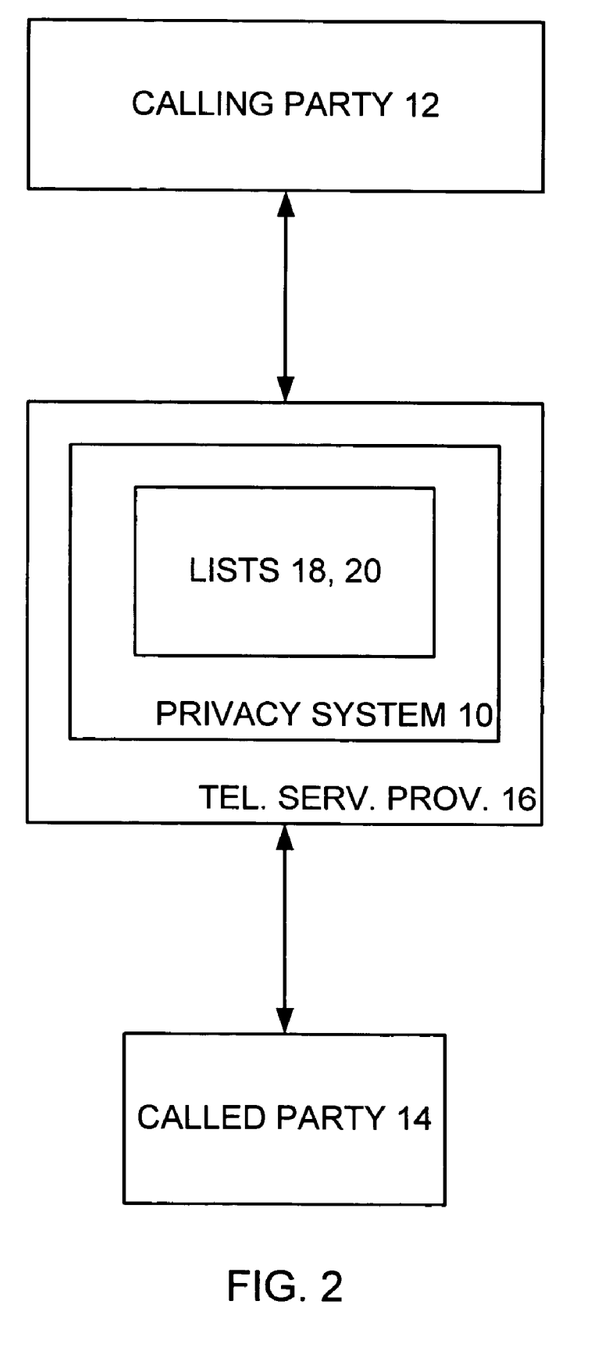
FIG. 2 is a block diagram showing a calling party calling a called party by way of a telephone service provider of the called party, where the called party subscribes to a ring tone system in accordance with one embodiment of the present invention.

Referring to the drawings in detail, wherein like numerals are used to indicate like elements throughout, there is shown in FIG. 2 a ring tone system 10 for providing a ring tone service that identifies each of several different types of calls to a called party 12 from any calling party 14 by presenting a particular ring tone or other annunciation to the called party based on the type of call. Typically, the ring tone system 10 is implemented as a service to the called party 14 by the telephone service provider 16 of the called party 14, and is at least partially implemented at an SSP 105 or central office administered by the telephone service provider 16. The ring tone system 10 may be AIN-based or non-AIN based without departing from the spirit and scope of the present invention.

Notably, and as mentioned above, a ring tone is merely one category of annunciation that may be employed. In fact, any other category of annunciation may also be employed without departing from the spirit and scope of the present invention. For example, the annunciation may be any sort of sound including bells, whistles, spoken material, etc., any sort of visual presentation including lights of one or more colors and or sequences, etc., or the like. Significantly, the annunciation or ring tone, whatever it may be (hereinafter, 'ring tone'), has the effect of alerting the called party to the call and the called party may thereby decide to answer same.

Also notably, and as also mentioned above, the ring tone may be generated by at an end office/central office/switching center or the like or may be generated at the telephone or the like in response to a ring tone generation command from an end office/central office/switching center or the like without departing from the spirit and scope of the present invention.

In one embodiment of the present invention, when a calling party 12 calls a called party 14, the ring tone system 10 determines what type the call may be classified as and based on the type of call presents the called party 14 with a ring tone corresponding to such type of call. Note that each type of call may be any type of call without departing from the spirit and scope of the present invention, and may be defined by the called party 14 and/or the ring tone system 10. For example, the types of calls may include normal calls, urgent calls, emergency calls, non-urgent calls, calls from relatives and/or friends, calls from business associates, calls from strangers, calls from telemarketers, calls from solicitors, and the like.

Correspondingly, each corresponding ring tone may be any appropriate ring tone without departing from the spirit and scope of the present invention, and may be defined by the called party 14 and/or the ring tone system 10. For example, the ring tone for a normal call may be a normal trill or warble, while the ring tone for an emergency or urgent call may be an extended trill and the ring tone for a non-emergency or non-urgent call may be a shortened trill. Similarly, the ring tone for calls from relatives and/or friends and/or business associates may include a crescendo sound while the ring tone for calls from strangers, telemarketers, solicitors, and the like may include a doom sound. Accordingly, and based on the ring tone presented with a particular call, the called party 14 may have an opportunity to decide to answer the call based on the type of the call as represented by the ring tone presented for such call.

In the case where the called party 14 defines the ring tone for each type of call, such called party 14 may so define and modify the ring tones in any appropriate manner without departing from the spirit and scope of the present invention. For example, each called party 14 may define or have defined therefor a corresponding list 18 of the ring tones and corresponding types of calls by way of a computer connected to the ring tone system 10 over a network such as the Internet (not shown), or may define the list 18 by accessing the ring tone system 10 over the telephone network by way of a specified telephone number. Likewise, the ring tones themselves may be defined by the called party 14 and/or may be selected by the called party 14 from pre-defined ring tones established by the telephone service provider 16 and/or the ring tone system 10.

In one embodiment of the present invention, ring tone system 10 itself determines the type of a particular call, at least in some instances. For example, the ring tone system 10 may determine from available information that a call is coming from a doctor, a hospital, a police station, or the like, and automatically identify the call as an emergency call. Similarly, the ring tone system 10 may determine from available information that a call is coming in from a long distance during the dinner hour from behind a private switch and automatically identify the call as coming from a stranger, a solicitor, or a telemarketer.

In one embodiment of the present invention, the ring tone system 10 determines that a call is from a calling party 12 previously identified by the called party 14 as being a friend or acquaintance, and automatically identifies the call as coming therefrom. To enable such a situation, it may be that each called party 14 can define a corresponding list 20 of privileged calling parties 12, again by way of a computer connected to the ring tone system 10 over a network such as the Internet (not shown), or by accessing the ring tone system 10 over the telephone network by way of a specified telephone number.

Such list 20 may be based on the telephone number or telephone numbers of each privileged calling party 12, and may specify a type of call for the privileged calling party 12. Alternatively, being on the list 20 may in itself determine the type of the call in a particular manner. Thus, the telephone number of the calling party 12 as presented to the telephone service provider 16 of the called party 14 may be forwarded to the ring tone system 10 and compared to the list 20 of the called party 14 to determine whether the calling party 12 has been specified by the called party 12 as being privileged, and if so a corresponding ring tone may be presented to the called party. Of course, the list 20 may be based on indicia other than the telephone number of the calling party 12 without departing from the spirit and scope of the present invention.

In the instance where the ring tone system 10 cannot or does not determine a particular type of a call from a calling party 12, the ring tone system 10 may prompt the calling party 12 to identify such a type, perhaps by an audio prompt, and the calling party 12 may identify the type of the call, perhaps by keying in a menu selection on a telephone keypad. Notably, if the calling party 14 refuses to identify a type for the call, the ring tone system 10 may choose to type the call in a predetermined manner, such as of a low priority, or may choose to refuse to put the call through. As may be appreciated, such handling may be defined by the calling party 14.

Figure 3:
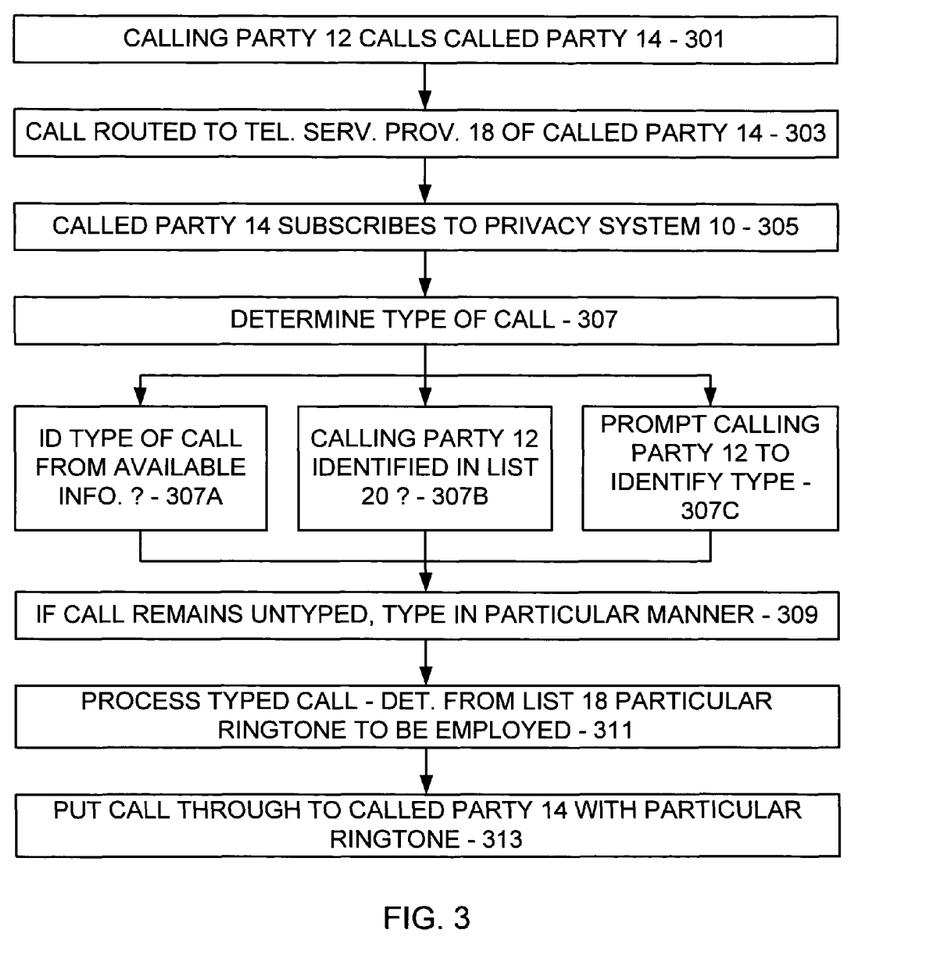
FIG. 3 is a flow diagram showing steps performed in connection with the call from the calling party to the called party of FIG. 2.

In one embodiment of the present invention, and referring now to FIG. 3, a method for processing a call from a calling party 12 to a called party 14 by way of the ring tone system 10 and the list 20 is as follows:

The process begins when a calling party 12 places a call to a called party 14 at a telephone service provider 16, where the called party 14 subscribes to the ring tone system 10 and may maintain the lists 18 and/or 20 such as were set forth above (step 301). In the normal course, the call is routed to the telephone service provider 18 of the called party 14 (step 303), where it is noted by way of a trigger or the like that the called party 14 subscribes to the ring tone system 10 (step 305). Accordingly, and in accordance with the ring tone system 10, the call is examined to determine a type therefor (step 307).

In particular, the ring tone system 10 may determine whether the type of the call can be identified by from available information (step 307a). If so, the typed call is processed, and if not, the ring tone system 10 determines whether the call is from a calling party 12 previously identified by the called party 14 in the list 20 for such called party 14 (step 307b). If so, the call is typed according to the calling party 12 being on the list 20 and is processed, and if not, the ring tone system 10 prompts the calling party 12 to identify such a type, perhaps by an audio prompt (step 307c). If the calling party 12 identifies the type of the call, perhaps by keying in a menu selection on a telephone keypad, the typed call is processed, and if not, the ring tone system 10 un-typed call is processed by being typed in a particular manner, such as for example of a low priority, or by being terminated (step 309).

In any event, once the ring tone system 10 types a call, the typed call is processed by determining from the list 18 for the called party 14 a particular ring tone to be employed to annunciate the call to the called party 14 by way of a telephone or the like thereof (step 311). Thereafter, the ring tone system 10 puts the call through to the called party 14 with the particular ring tone (step 313). In the case where the ring tone is generated by the end office, central office, switching center, or the like associated with the called party 14, the ring tone system 10 sends a ring tone generation command to such end office, central office, switching center, or the like to generate the ring tone, and in the case where the ring tone is generated at the telephone or the like, the ring tone system 10 sends the ring tone generation command to the telephone of the called party 14 by way of such end office, central office, switching center, or the like. In either instance, the receiver of the generation command should be configured to understand and obey the command.

Figure 4:
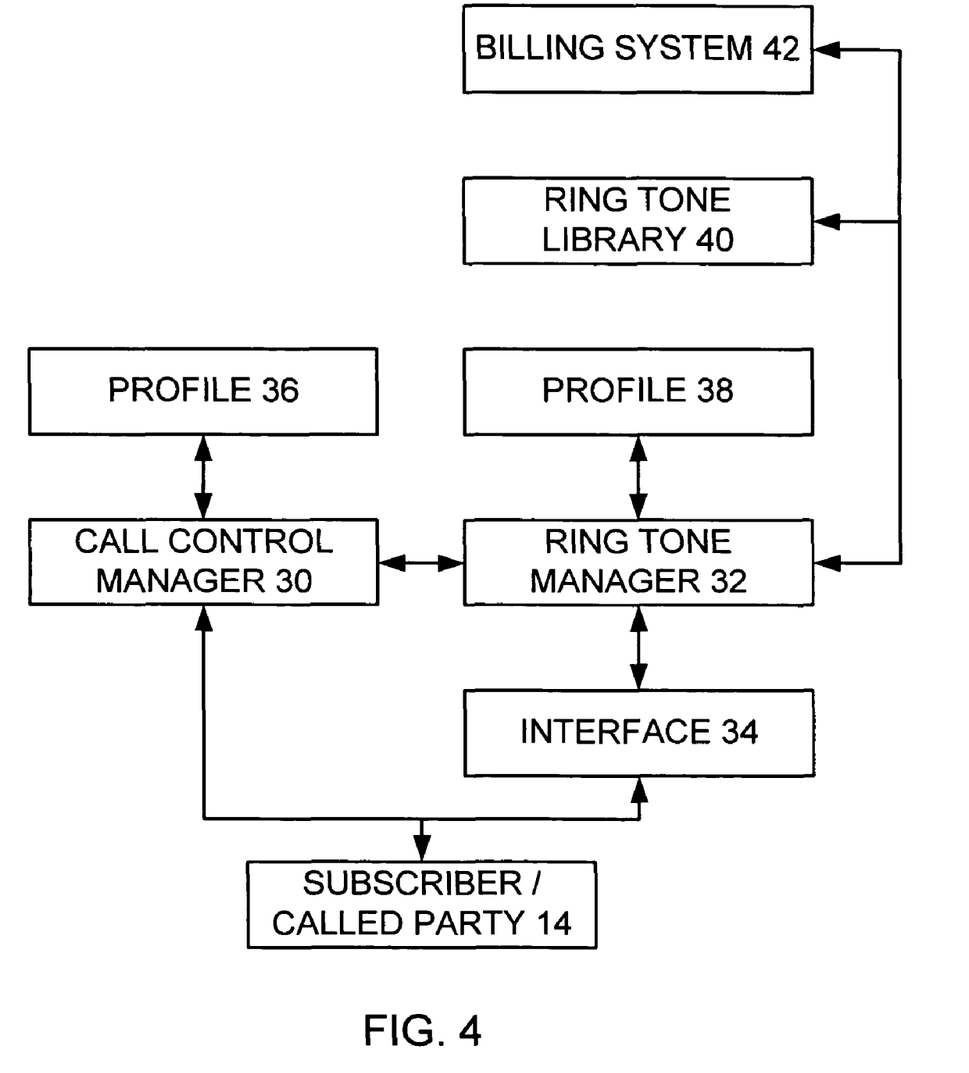
FIG. 4 is a block diagram showing a system for selecting a ring tone and for forwarding a selected ring tone to a device of the called party of FIG. 2 in accordance with one embodiment of the present invention.

Turning now to FIG. 4, in another embodiment of the present invention, the ring tone is delivered to the telephone 103 device by a network-based call control manager 30 upon consulting with a network-based ring tone manager 32. In such embodiment, the ring tone may be generated by the call control manager 30 and thus delivered to the telephone 103, or the ring tone may be delivered to the telephone 103 as a file or the like during call setup and the telephone 103 may itself generate the ring tone by rendering such file in an appropriate manner.

Significantly, with network-based control of the ring tone by the call control manager 30, the same ring tone may be employed across multiple telephones 103 and other similar devices of a particular called party 14. Such devices include but are not limited to VoIP (Voice over Internet Protocol) SIP (Session Initiation Protocol) phones, cordless SIP phones, cordless WiFi SIP phones, cellular phones, and SIP clients on any device, such as a personal computer. Also significantly, with a network-based user interface 34, a called party 14 can control and manage ring tones across all network-based devices 103 owned or controlled by such called party 14.

With the present invention, then, a called party does not download and store ring tones to a device 103 by way of such device 103, such as for example may be the case with a cellular telephone 103. Instead, with the aforementioned interface 34, the called party 14 subscriber uses the menu of the cellular phone to associate different ring tones with different types of incoming calls and/or different devices 103 of such called party 14, and such associations are stored by the network-based ring tone manager 32 for later retrieval and delivery to the call control manager 30 during setup of a call from a calling party 12 to the called party 14 at a particular device 103 thereof.

In one embodiment of the present invention, the call control manager 30 is notified of an incoming call for the called party and in connection with setting up such call such call control manager 30 queries the ring tone manager 32 to determine a ring tone to be employed to annunciate the call at one or more devices 103 of the called party 30. In particular, the call control manager 30 determines based on a profile 36 for the called party 14 that ring tones therefor are managed by ring tone manager 32, and thus requests and receives instructions from such ring tone manager 32 regarding a particular ring tone to be employed for annunciating the call to the called party 14 at one or more devices 103 thereof.

The ring tone manager 32 may host the aforementioned interface 34 which the called party 14 employs to define ring tone associations, and the ring tone manager 32 may store such associations in a profile 38 for the called party 14, where such profile 38 is likely separate from the profile 36 but may also be such profile 36. As may be appreciated, the profile 38 for the called party 14 includes information relevant to the called party 14 including phone numbers, devices 103, ring tones established for use by such called party 14, and associations between the ring tones, the devices 103, and/or the types of incoming calls. Thus, upon receiving the aforementioned request for instructions from the call control manager 30, the ring tone manager 32 accesses the profile 38 of the called party 14 and based on settings therein delivers a ring tone to the call control manager 30 to be forwarded to a device 103 of the called party 14 for annunciation of the call being set up.

In addition, in one embodiment of the present invention, the ring tone manager 32 may maintain links with one or more ring tone libraries 40 to facilitate acquisition of ring tones therefrom on behalf of the called party 14. Also, the ring tone manager 32 may maintain a link with a billing system 42 to bill the called party 14 in connection with use of the ring tone manager 32.

Figure 5:
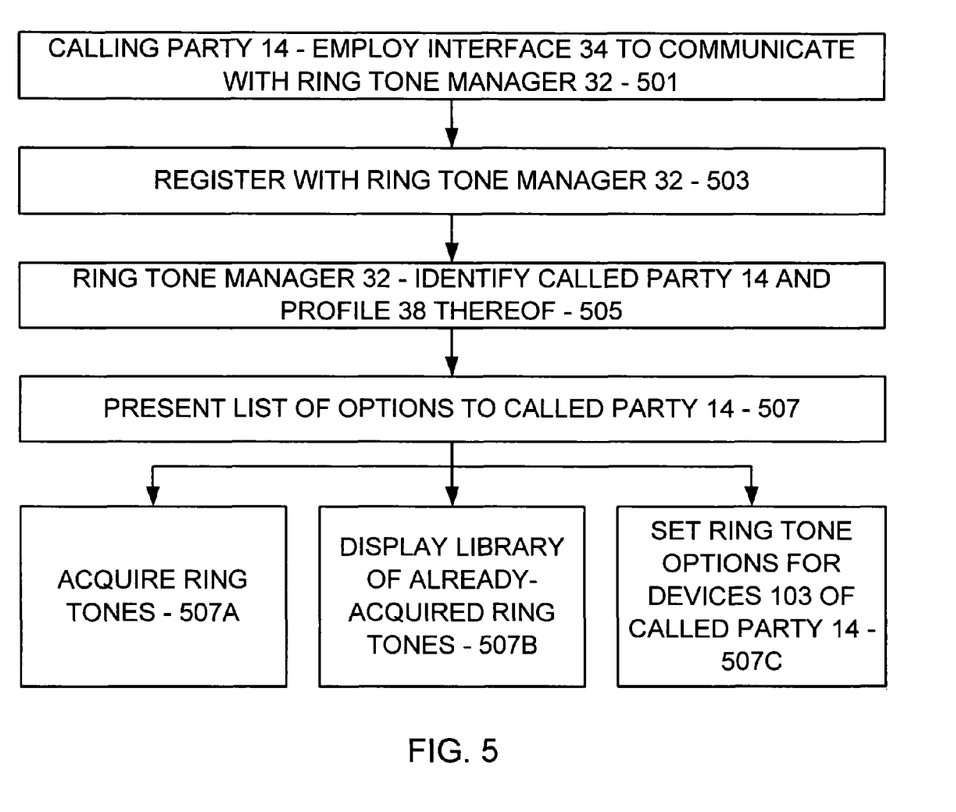
FIG. 5 is a flow diagram showing steps performed in connection with the called party of FIG. 2 selecting ring tones in accordance with one embodiment of the present invention.

Turning now to FIG. 5 a method employed by a calling party 14 and the ring tone manager 32 to set ring tones for the calling party 14 is set forth. Preliminarily, the calling party 14 would employ the interface 34 to communicate with the ring tone manager 32 (step 501). Such interface 34 may of course be any interface without departing from the spirit and scope of the present invention. For example, the interface 34 may be network-based, and the called party 14 may thus communicate with the ring tone manager 32 through the interface 34 by way of a network such as the Internet.

Within such interface 34, the called party 14 would register with the ring tone manager 32 as necessary (step 503), and the ring tone manager 32 upon identifying the called party 14 and the profile 38 thereof (step 505) would present a list of options to such called party 14 (step 507). For example, such options may include but are not limited to acquiring ring tones from one or more providers (step 507a), displaying a library of already-acquired ring tones of the called party 14 (step 507b), and setting ring tone options for devices 103 of the called party 14 based on the already-acquired ring tones thereof (step 507c).

Particularly with acquiring ring tones, the ring tone manager 32 may by way of the interface 34 allow the called party 14 to choose a ring tone provider to access and to choose a ring tone to acquire from such provider. Upon doing so, the ring tone manager 32 would in fact obtain from the provider a file or the like containing the acquired ring tone, and store the file or the like in connection with the profile 38 of the called party 14. For example, the file or the like may be stored in an appropriate database and the profile 38 would include an appropriate reference to such database. In the event that the ring tone is digitally rights-managed, the database may also include a license or the like defining the conditions by which the called party 14 can use the ring tone.

If necessary, the ring tone manager 32 may also create a record of the acquisition of the ring tone, including a definition of the ring tone purchased, purchase price, and related information, and may send such record to the billing system 42 for eventual billing to the called party 14 or the like. If advisable, the ring tone manager 32 may also keep a copy of the acquisition record for settlement purposes.

Particularly with regard to setting ring tone options, the ring tone manager 32 may by way of the interface 34 allow the called party 14 to set a distinctive ring tone for each device 103 of the called party 14, set a ring back tone for each device 103, set delivery of distinctive ringing based on type of calling party 12, and set priority of receiving distinctive ringing from a particular type of calling party 12, among other things.

With regard to setting distinctive ring based on type of calling party 12, the called party 14 may by way of the interface 34 associate a type of calling party 12 or a particular calling party 12, perhaps by way of a phone number thereof, with a particular acquired ring tone. The called party 14 may also set such ring tone to ring all devices 103 of such called party 14, or to only certain ones of such devices 103. Additionally, the called party may by way of the interface 34 set such ring tone to ring to a forwarded telephone number. Moreover, the called party may by way of the interface 34 set whether such ring tone is to be overridden in the event that a calling party 12 has itself selected a distinctive ring in connection with a call. Finally, the called party may be way of the interface 34 set a ring tone when acting as such a calling party 12, among other things.

At any rate, once ring tones are set, such ring tones may be communicated to each device 103 of the called party 14 either prior to receiving a call from a calling party 12 or in connection with receiving such a call. In the former case, each device 103 establishes a connection with the ring tone manager 32, such as for example when the device 103 is turned on, and the device 103 determines if the called party 14 has changed ring tone settings relevant thereto. If so, the ring tone manager 32 sends the new settings to the device 103, including ring tones if appropriate, and the device 103 appropriately stores same.

Figure 6:
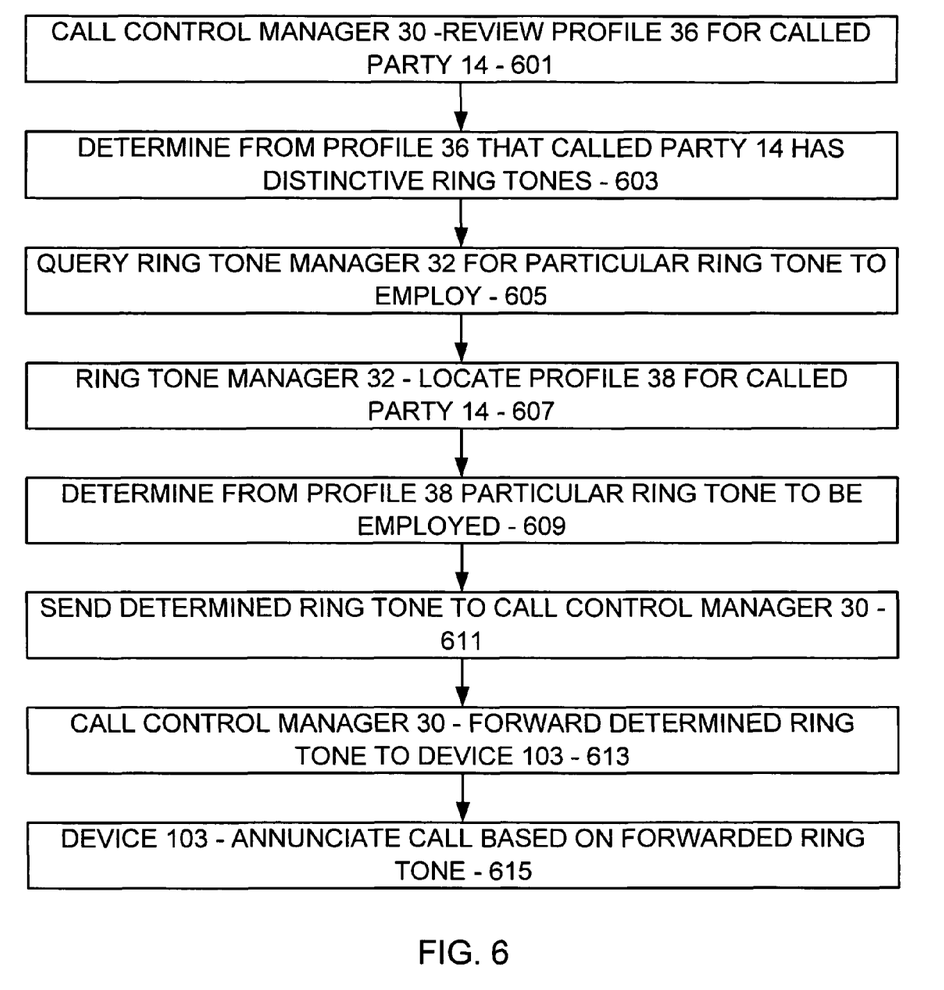
FIG. 6 is a flow diagram showing steps performed in connection with the called party of FIG. 2 receiving a call annunciated by a selected ring tone in accordance with one embodiment of the present invention.

In the latter case, and referring now to FIG. 6, during setup for a particular call, the call control manager 30 reviews the profile 36 for the called party 14 (step 601), determines therefrom that such called party 14 has set up distinctive ring tones (step 603), and thus queries the ring tone manager 32 for a particular ring tone to employ (step 605). Based on an identification of the called party 14 in such query, the ring tone manager 32 can locate the profile 38 for such called party 14 (step 607), and determine therefrom a particular ring tone to be employed (step 609). Such determination may of course be done on any particular basis without departing from the spirit and scope of the present invention. For example, such determination may be based on the calling party 12 or type of calling party 12.

At any rate, the ring tone manager 32 sends the determined ring tone to the call control manager 30 (step 611), as a file or the like, and the call control manager 30 forwards the determined ring tone to the device 103 (step 613). Thus, the device 103 annunciates the call based on the forwarded ring tone (step 615).

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method and mechanism by which the called party 14 subscribing to the ring tone system 10 or service can identify privileged calling parties 12 that are not required to be screened by the privacy service 10. More particularly, the present invention comprises a new and useful ring tone system 10 and method by which a called party 14 can be provided with a different ring tone for each of several types of calls, and therefore has an opportunity to decide to answer each call based on the nature of the call as represented by the ring tone presented for such call. Further, the present invention comprises a new and useful system 10 whereby the ring tone is provided to the telephone or other device 103 by a network-based ring tone manager 32 and a network-based call control manager 30 while the call is being setup.

It should be appreciated that changes could be made to the embodiments described above without departing from the inventive concepts thereof. Notably, the present invention is equally applicable to wire line, wireless, and network-based telephone systems. It should be understood, therefore, that this invention is not limited to the particular embodiments disclosed, but it is intended to cover modifications within the spirit and scope of the present invention as defined by the appended claims.

The invention claimed is:

1. A ring tone system providing a ring tone service to a called party receiving a call from a calling party, the ring tone system comprising:

a network-based call control manager receiving a notification that the calling party is calling a device of the called party, the network-based call control manager prompting the calling party to identify a type of the call; and a network-based database storing a selection of ring tones associated with calling numbers and with types of calls, the network-based database queried by the network-based call control manager and retrieving a ring tone when the calling number is associated with the type of the call, the network-based call control manager prompting the calling party to identify the type of the call when the calling number is unassociated in the selection of ring tones, and the network-based call control manager typing the call in a predetermined manner when the calling party refuses to identify the type of the call;

wherein the network-based database notifies the network-based call control manager of the ring tone, and the network-based call control manager presents the ring tone on the call that is set-up between the calling number and a called number associated with the device of the called party.

2. The system of claim 1 further comprising a profile corresponding to the called number, the network-based database determining the ring tone by querying the profile corresponding to the called number, the profile associating the calling number, the type of the call, and the ring tone for the type of the call.

3. The system of claim 1, wherein the network-based call control manager generates the ring tone at a central office.

4. The system of claim 1, wherein the network-based call control manager refuses the call according to the predetermined manner when the calling party refuses to identify the type of the call.

5. The system of claim 1 further comprising an interface by which the called party accesses the network-based database to determine the ring tone.

6. The system of claim 5 further comprising a library of ring tones, the library of ring tones being accessible to the called party over an Internet connection such that the called party determines the ring tone by selecting from the library of ring tones.

7. The system of claim 6, wherein the network-based database receives a selection of the ring tone from the called party and stores the ring tone in association with the calling number in the network-based database.

8. The system of claim 7, wherein the network-based call control manager sets an option on the device of the called party based on the ring tone.

9. The system of claim 1, wherein the network-based database communicates a file representative of the ring tone to the device of the called party.

10. A method of providing a ring tone service to a called party receiving a call from a calling party, the method comprising:

receiving a notification at a network-based call control manager that a calling number is calling a device at a called number;

determining a type of the call based on the calling number;

querying a network-based database storing a selection of ring tones associated with calling numbers and with types of calls;

retrieving a ring tone from the selection of ring tones when the calling number is associated with the type of the call;

prompting the calling party to identify the type of the call when the calling number is unassociated in the selection of ring tones;

typing the call in a predetermined manner when the calling party refuses to identify the type of the call;

retrieving the ring tone associated with the predetermined manner;

notifying the call control manager of the ring tone; and presenting the ring tone on the call that is set-up between the calling number and the device at the called number.

11. The method of claim 10 further comprising querying the network-based database for a profile corresponding to the called number, the profile associating different calling numbers to the types of calls and to a corresponding ring tone for each type of call.

12. The method of claim 10 further comprising querying the network-based database for the ring tone corresponding to the calling number, the profile including different calling numbers and a corresponding ring tone for each calling number.

13. The method of claim 10 further comprising generating the ring tone at a central office.

14. The method of claim 10 further comprising generating the ring tone at the device at the called number.

15. The method of claim 14 further comprising allowing the called party to access a network-based library of ring tones over the Internet such that the called party determines the ring tone by selecting from the network-based library of ring tones.

16. The method of claim 15 further comprising receiving a selection of the ring tone from the library of ring tones and storing the ring tone in association with the calling number.

17. The method of claim 10 further comprising communicating a ring tone file representative of the ring tone to the device at the called number prior to the call from the calling number such that the ring tone file is stored locally in the device and the ring tone file notifies the device of the ring tone to annunciate the call.

18. The method of claim 10 further comprising communicating a file representative of the ring tone to the device at the called number during setting up the call from the calling number.

19. A method, comprising:

receiving a notification that a calling number is making a call to a device at a called number;

determining a type of the call based on the calling number;

querying a network-based database storing a selection of ring tones associated with calling numbers and with types of calls;

retrieving a ring tone from the selection of ring tones when the calling number is associated with the type of the call;

prompting a calling party to identify the type of the call when the calling number is unassociated in the selection of ring tones;

typing the call in a predetermined manner when the calling party refuses to identify the type of the call;

assigning the ring tone associated with the predetermined manner; and forwarding the ring tone file to the device at the called number; and presenting the ring tone file at the device at the called number to annunciate the call from the calling number to the called number.

* * * * *